Sept. 28, 1926.
G. A. HAYNES
1,601,018
CALENDAR EQUIPPED WITH DETACHABLE TAGS
Filed June 23. 1925
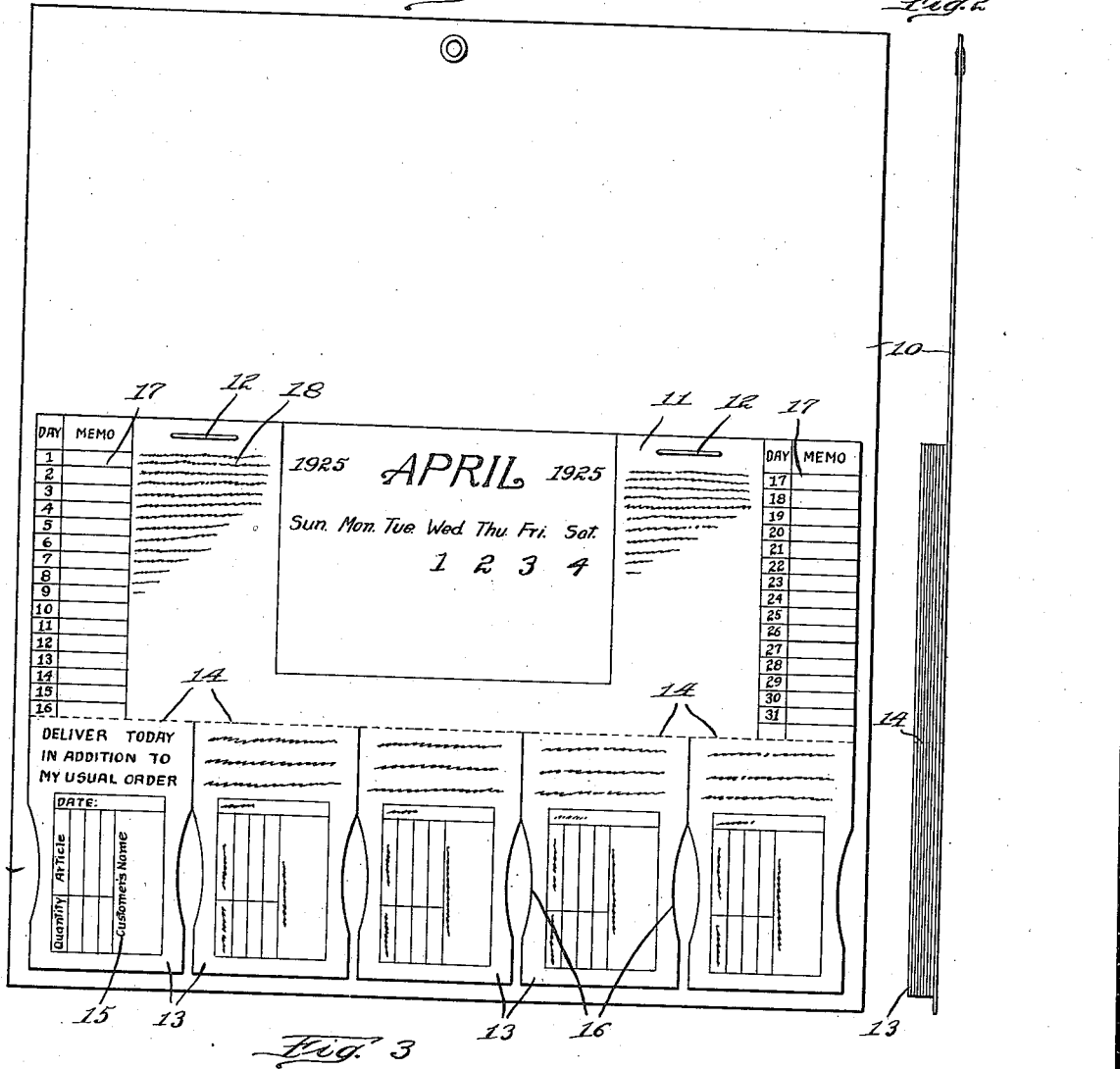
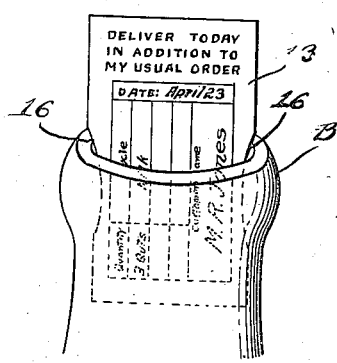

Patented Sept. 28, 1926.

1,601,018

UNITED STATES PATENT OFFICE.

GEORGE A. HAYNES, OF DEDHAM, MASSACHUSETTS.

CALENDAR EQUIPPED WITH DETACHABLE TAGS.

Application filed June 23, 1925. Serial No. 39,001.

This invention relates to calendars and more particularly to a calendar equipped with series of detachable tabs or tags which may constitute order blanks for the class of goods which the calendar may be gotten up to advertise. While having other and varied fields of usefulness, the invention is well adapted and designed for use as a calendar advertising milk and other dairy products. The foregoing and other objects and advantages of the invention will more fully appear from the following detailed description taken in connection with the accompanying drawings, and the distinctive features of novelty will be pointed out in the appended claims.

Referring to the drawings:

Fig. 1 is an elevation showing a calendar embodying the invention.

Fig. 2 is an edge view thereof; and

Fig. 3 is a partial perspective view illustrating the use of one of the order tags.

10 indicates the calendar body or backing sheet which may have a pad of sheets 11 for the several months of the year secured thereto in usual manner by staples 12 or the like. In accordance with my invention, each of the sheets of this pad has its lower portion formed as, or bearing, a series of tags or tabs 13, preferably pre-separated from each other laterally, and united to the body of the sheet with a weakened or scored line 14 on which they may be readily severed from the body of the sheet. These individual tags may bear suitable indicia as indicated at 15 to indicate the necessary data for an order for such additional dairy supplies as the housewife may be in need of,—as shown having spaces for the customer's name, the day, and the quantity wanted of the article named. Each of these tags may also have its sides cut away intermediate its length as indicated at 16 so as to embrace and be held within the neck of an ordinary milk bottle B,—these tags being preferably produced of a size so as to fit within the usual dimension of milk bottle. The body of each sheet may also be equipped with series of spaces 17 suitably noted for marking down the necessary memo of the articles ordered on the respective tags as they are torn off,— thus corresponding to the stubs of a bank check book. The residual space of the sheets indicated at 18 may be employed to present cooking or like household recipes.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A calendar sheet bearing co-related weekly and monthly time indicia and said sheet having a portion thereof formed as a plurality of tag portions adapted to be severed from the sheet to constitute individual tags, and each of said tags having marked spaces to receive indicia for ordering goods.

2. A calendar comprising a pad composed of sheets bearing calendar indicia, and each of said sheets severed, and having weakened lines for severance, to define a plurality of tags adapted to be detached therefrom, each of said tags having marked spaces to constitute an order form for certain goods, and the body of the sheet having marked spaces adapted to be filled in in accordance with the orders made on tags as they are detached therefrom.

3. A calendar comprising a series of sheets, each bearing monthly calendar indicia and each of said sheets partially severed, and having weakened lines for further severance to constitute a series of tags each having marked spaces to receive order indicia, the sides of each of said tags having cut away portions adapting the same to fit into the neck of a milk bottle or the like.

In testimony whereof I affix my signature.

GEORGE A. HAYNES.